Patented Feb. 22, 1949

2,462,277

UNITED STATES PATENT OFFICE 2,462,277

METHOD OF PREPARING AN ACTIVATED MAGNESIUM OXIDE

John J. Naugle, New York, N. Y.

No Drawing. Application November 27, 1946, Serial No. 712,725

1 Claim. (Cl. 252—413)

This invention relates to the treatment of sugar-purifying media, and more particularly, to the reactivation of the precipitates resulting from the purification of sugar liquids with activated magnesia, for example, as described and claimed in my copending application entitled "Defecation of sugar solutions," Serial No. 543,423, filed July 3, 1944 (now Patent No. 2,422,699).

Activated magnesia, when employed in the process set forth in said copending application, produces a precipitate which consists mainly of magnesium hydrate impregnated with organic matter adsorbed from the liquid being treated together with small amounts of organic and inorganic compounds of magnesium. It has been found that by the methods to be hereinafter described magnesium oxide in highly activated form can be recovered from such precipitates, the reactivated material showing adsorbtive properties equal to those of virgin or newly manufactured material. As a result, a given quantity of activated magnesia can be reactivated and reused many times before it becomes so exhausted as to warrant its being discarded.

In accordance with one embodiment of the methods of the present invention, spent magnesia or magnesium hydrate, for example, in the form of filter cake, is suspended in water, preferably, about 2 parts by weight of cake to about 200 parts by weight of water.

Carbon dioxide gas is bubbled through the suspension until the pH of the latter, which before treatment is about 10.5, is reduced to about 6.5. At this point, all of the magnesium compound initially present is in solution in the form of magnesium bicarbonate. It is preferable to carry out this treatment under pressure, for this increases the speed with which the magnesium bicarbonate goes into solution, and avoids the necessity of using the large volume of water above referred to.

The solution is then boiled, causing the bicarbonate to decompose with the formation of the insoluble carbonate, while colored impurities remain in solution. The carbonate is permitted to settle and the clear liquor, which is usually yellow in color, is decanted off. The solids, consisting mainly of magnesium carbonate, are filtered and washed, and then calcined at a temperature of about 500 to about 950 degrees C., thus producing highly activated magnesium oxide.

In accordance with another embodiment of the methods of the present invention, the spent magnesia is made into a slurry with water, using 2 parts of magnesia to 100 parts of water. Carbon dioxide gas is then bubbled through the slurry until the magnesia is converted to magnesium carbonate, which point is indicated by the pH of the slurry dropping from its initial value of about 10.5 to about 9.0. The slurry is then filtered and washed. This treatment removes a considerable part of the impurities which are brought into solution by the action of the carbon dioxide. The relatively pure magnesium carbonate is then calcined at a temperature of about 500 to about 950 degrees C., with the formation of activated magnesium oxide.

In accordance with a third embodiment of the methods of the present invention, the spent magnesia, for example, in the form of filter cake, is washed substantially free from the sugar treated therewith. The washed cake is appreciably, but not completely, dewatered under vacuum, and the dewatered cake is introduced into a roasting oven wherein it is treated for a length of time which is a function of the temperature employed.

For example, very favorable results are obtained by heating for approximately 30 minutes at a temperature of about 550 degrees C. However, substantially equal results are obtained by heating for approximately 10 minutes at a temperature of about 700 degrees C., or for approximately 5 minutes at about 850-900 degrees C.

This completes the description of the methods of the present invention. It will be noted from all of the procedures above described, that the present invention is simple and inexpensive to carry out, and results in the recovery of a highly activated magnesia having a particular affinity for the color, flavor and odor-imparting bodies natural to crude sugar liquors, cane and beet sugar juices and saccharine liquids in general. While the present invention has been described as a method of reactivating a sugar-purifying medium, it is to be understood that the reactivated material is also useful in the treatment of vegetable and mineral oils, water, and other liquids requiring purification.

Other advantages of the methods of the present invention will readily occur to those skilled in the art to which the same relates.

I claim:

The method which comprises; suspending magnesium hydrate, which is impregnated with organic matter adsorbed from sugar liquids, in water; bubbling gaseous carbon dioxide through said suspension until the pH thereof is adjusted to about 6.5 and the magnesium compound initially present is in solution in the form of magnesium bicarbonate; boiling said solution until the soluble magnesium bicarbonate is transformed into the insoluble magnesium carbonate; removing said magnesium carbonate from said solution; and thereafter calcining said magnesium carbonate at a temperature of from about 500 to about 950 degrees C. to transform the same into activated magnesium oxide.

JOHN J. NAUGLE.

REFERENCES CITED

The following references are of record in the file of this patent:

UNITED STATES PATENTS

| Number | Name | Date |
|---|---|---|
| 1,863,966 | Brosche | June 21, 1932 |
| 2,210,892 | Brandenburg | Aug. 13, 1940 |